(12) United States Patent
Speakman et al.

(10) Patent No.: US 10,901,717 B2
(45) Date of Patent: Jan. 26, 2021

(54) CONTROLLING COMPUTER EXECUTIONS BASED ON TERMS AND CONDITIONS AND USER DEVICE ATTRIBUTES

(71) Applicant: International Business Machines Corporation, Armonk, NY (US)

(72) Inventors: Skyler Speakman, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/035,827

(22) Filed: Jul. 16, 2018

(65) Prior Publication Data

US 2020/0019394 A1 Jan. 16, 2020

(51) Int. Cl.
  *G06F 8/61* (2018.01)
  *G06F 9/445* (2018.01)
  *G06N 5/02* (2006.01)
  *G06F 16/904* (2019.01)

(52) U.S. Cl.
  CPC .............. *G06F 8/61* (2013.01); *G06F 9/4451* (2013.01); *G06F 16/904* (2019.01); *G06N 5/025* (2013.01)

(58) Field of Classification Search
  None
  See application file for complete search history.

(56) References Cited

U.S. PATENT DOCUMENTS 6,934,715 B2 8/2005 Kalmes et al.
8,918,632 B1* 12/2014 Sartor ................. G06F 21/53
  713/152
9,454,758 B2* 9/2016 Desai ................. G06Q 20/3829
2002/0129004 A1 9/2002 Bassett et al.
2005/0049891 A1 3/2005 Wilson
2005/0071226 A1* 3/2005 Nguyen ............. G06Q 30/0231
  705/14.31
2006/0179009 A1 8/2006 Tagg
2007/0073659 A1 3/2007 Lee et al.
2007/0078673 A1 4/2007 Lee et al.

(Continued)

OTHER PUBLICATIONS

Madrigal, A.C., "Reading the Privacy Policies You Encounter in a Year Would Take 76 Work Days", Mar. 1, 2012, https://www.theatlantic.com/technology/archive/2012/03/reading-the-privacy-policies-you-encounter-in-a-year-would-take-76-work-days/253851/, Accessed on Jul. 12, 2018, 3 pages.

*Primary Examiner* — Wei Y Zhen
*Assistant Examiner* — Binh Luu
(74) *Attorney, Agent, or Firm* — Scully, Scott, Murphy & Presser, P.C.; Shimon Benjamin

(57) ABSTRACT

A request to install an application on a device may be received, and data associated with the device and a set of users associated with the device may be received. Acceptance factors specified in a terms and conditions document associated with the application to be installed on the device may be identified. A terms and conditions implication of installing the application on the device may be determined based on the acceptance factors. Based on the terms and conditions implication, a rule may be dynamically generated to control at least a running of the application on the device. The rule may be activated or caused to be activated on the device. The activation of the rule may control the running of the application on the device.

20 Claims, 4 Drawing Sheets

(56) References Cited

U.S. PATENT DOCUMENTS

| | | | | |
|---|---|---|---|---|
| 2007/0133763 A1* | 6/2007 | D'Angelo | H04W 12/08 | 379/93.02 |
| 2008/0059214 A1* | 3/2008 | Vinberg | G06F 8/61 | 709/221 |
| 2009/0241104 A1 | 9/2009 | Amiga et al. | | |
| 2009/0327908 A1* | 12/2009 | Hayton | G06F 21/6218 | 715/744 |
| 2010/0222037 A1* | 9/2010 | Dragt | G06Q 30/02 | 455/414.1 |
| 2012/0260232 A1 | 10/2012 | Hirsch et al. | | |
| 2013/0055378 A1* | 2/2013 | Chang | G06F 21/53 | 726/17 |
| 2013/0173642 A1* | 7/2013 | Oliver | G06F 17/27 | 707/756 |
| 2013/0276124 A1* | 10/2013 | Tahir | H04W 4/029 | 726/25 |
| 2013/0337789 A1* | 12/2013 | Johnson | H04W 4/029 | 455/414.1 |
| 2014/0096025 A1* | 4/2014 | Mandel | H04L 67/34 | 715/739 |
| 2014/0109072 A1* | 4/2014 | Lang | G06F 8/65 | 717/168 |
| 2014/0163967 A1* | 6/2014 | Aratsu | G06F 17/27 | 704/9 |
| 2014/0282371 A1 | 9/2014 | Hirsch et al. | | |
| 2015/0199197 A1* | 7/2015 | Maes | G06F 8/71 | 717/122 |
| 2015/0227989 A1* | 8/2015 | Chattopadhyay | G06Q 30/0282 | 705/317 |
| 2016/0092196 A1* | 3/2016 | Kuchibhotla | G06F 8/65 | 717/170 |
| 2017/0289128 A1* | 10/2017 | Kelley | H04L 63/1433 | |
| 2017/0300668 A1* | 10/2017 | Bawa | G06F 21/105 | |
| 2018/0005186 A1* | 1/2018 | Hunn | G06F 16/219 | |
| 2018/0131721 A1* | 5/2018 | Jones | G06F 21/604 | |

* cited by examiner

CONTROLLING COMPUTER EXECUTIONS BASED ON TERMS AND CONDITIONS AND USER DEVICE ATTRIBUTES

BACKGROUND

The present application relates generally to computers and computer applications, and more particularly to controlling execution of computer processes based on terms and conditions and user device attributes.

Computer application deployment and/or service executions usually ask a user to agree to terms and conditions before an application is installed and/or an online service is provided on a user device. For instance, such terms and conditions may specify consumer security related information and other terms and conditions associated with running an application and/or providing an online service on a user device. However, such terms and conditions are often lengthy to read, and may contain language which may not be always easy to understand.

BRIEF SUMMARY

A computer-implemented method and system of deploying a computer application on a computing device based on terms and conditions associated with the computer application may be provided. The method, in one aspect, may include receiving a request to install an application on a device. The method may also include receiving data associated with the device and a set of users (e.g., identifies of the user) associated with the device. The method may further include identifying acceptance factors specified in a terms and conditions document associated with the application to be installed on the device. The method may also include determining a terms and conditions implication of installing the application on the device based on the acceptance factors. The method may also include dynamically generating a rule to control at least a running of the application on the device based on the terms and conditions implication. The method may further include activating the rule on the device, the activating the rule controlling the running of the application on the device.

A system, in one aspect, may include at least one hardware processor coupled with a memory and a network interface. At least one hardware processor operable to at least receive a request to install an application on a device. At least one hardware processor may be further operable to receive data associated with the device and a set of users associated with the device. At least one hardware processor may be further operable to identify acceptance factors specified in a terms and conditions document associated with the application to be installed on the device. At least one hardware processor may be further operable to determine a terms and conditions implication of installing the application on the device based on the acceptance factors. At least one hardware processor may be further operable to dynamically generate a rule to control at least a running of the application on the device based on the terms and conditions implication. At least one hardware processor may be further operable to activate the rule on the device, the activating the rule controlling the running of the application on the device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
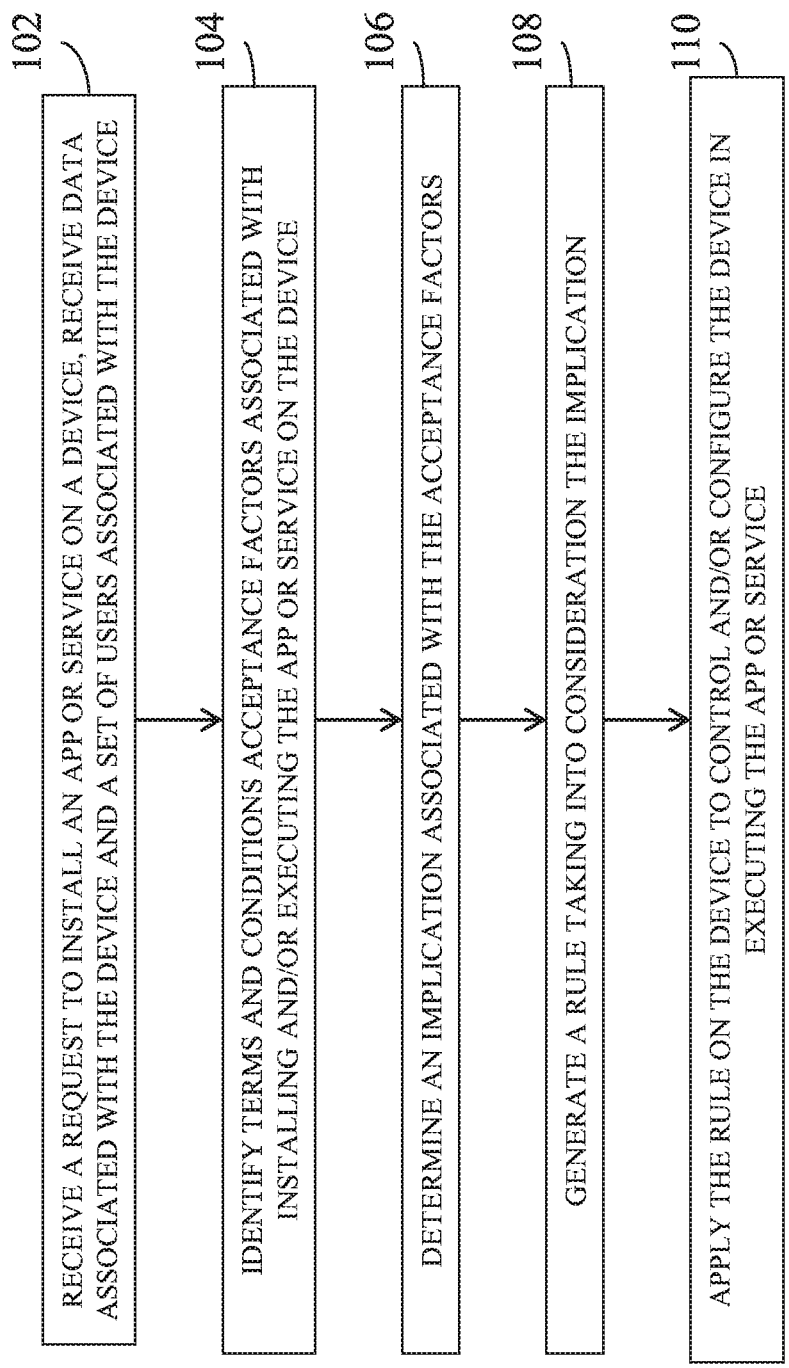
FIG. 1 is a diagram illustrating a method of the present disclosure according to an embodiment.

A method, system, and techniques in some embodiment may provide a read-assist for terms and conditions of running a computer application or online service, and for example, configuring the device based on implications of the terms and conditions. Acceptance factors associated with terms and conditions of installing an application, running an online service (e.g., web service or another service, e.g., provided via the Internet or the World Wide Web, or the like) may be extracted, for example, by analyzing various data on or from a user device. Examples of a user device may include, but are not limited to, a smartphone, a laptop computer, a desktop computer, another user computer, a tablet, and/or another user device. One or more implications associated with the terms and conditions (e.g., including cross referencing of terms and conditions implications) may be determined, and one or more rules may be dynamically generated to control or configure new terms and conditions, at least one application and an aspect of the user device. For instance, at least on aspect of the user device may be reconfigured to control execution of an application on the user device.

In some embodiments, a method and/or system may automatically read terms and conditions presented associated with running an application (such as a mobile app or a service) by performing a natural language processing on the terms and conditions document, and cross-referencing implications of the terms and conditions with other software (e.g., applications such as an app) installed on the user device. The method and/or system in some embodiments may also take into account implicit and/or explicit user-behavior to further personalize the implications of the terms and conditions for that user. In some embodiments, a device specific (e.g., personalized or customized) list of implications for accepting a terms and conditions may be presented on the user device. In some embodiments, a cognitive read-assist for terms and conditions associated with running computer processes, for example, applications and/or services may include configuring devices, via which executions of such computer processes may be controlled.

As an example, the following text items may be presented to the user after summarizing the terms and conditions associated with an app, the user may wish to install on a user's smartphone (or another device):

"This app follows your location. You may turn this feature off in settings (click here). Other apps that currently use location are A and B";

"This app has in-app purchases and can interact with your W wallet app. You may change these settings here (click here). Other apps that currently use wallet are A, B, and C";

"This app reads texts sent over X instant messaging app but not Y or Z instant messaging apps. This aligns with your preference to ensure no Y or Z messages are read by other apps";

"This app may access your photos locally and those shared by S social media app."

In the above examples, generally, a wallet app, for instance, may refer to an application or a mobile app that allows users to store items such as coupons, boarding passes, event tickets, store cards and credit cards, loyalty cards, and debit cards; an instant messaging app may refer to an application or a mobile app that allows users to send messages, and perform other communications. A social media app may refer to an application or a mobile app that allows users to share or exchange information, for example, over a computer-network.

In some embodiments, artificial intelligence techniques may be employed to implement a method and/or system of the present disclosure, which provides read-assist for terms and conditions, and their implications on a user device.

FIG. 1 is a diagram illustrating a method of the present disclosure according to an embodiment. At 102, a request for installing a new app or application, or a service, on a device (e.g., a smartphone or another computer or microprocessor device) may be received. For instance, a method and/or system in some embodiments may detect an app (or service) being installed on a computing device. Data or information associated with the device and a set of users using the device may be received. Such received data, e.g., may include the number of apps or applications installed on the device with their terms and conditions, device settings, user data, historical user behavior, and a request of installing a new app or application, or a service, on the device.

At 104, terms and conditions acceptance factors may be identified or extracted, in connection with a new app to be installed on the device, for example, based on the set of user and device data. For instance, the terms and conditions associated with the app being installed may be read and analyzed. In some embodiments, the data analyzed to identify or extract acceptance factors in a terms and conditions document in connection with installing or executing an app on a device may include explicit and/or implicit data. Examples of explicit data may include human generated messages such as Short Message Service (SMS) messages, e.g., received and/or sent text and/or audio messages, application or machine generated data such as micro-blogs from social media blogging accounts, messages generated in various messaging apps such as messages comprising text, video, audio and/or multimedia data. Other examples of explicit data may include data from device (e.g., smartphone) built-in sensors such as global positioning system (GPS), accelerometer, gyroscope, GPS, camera sensor, and/or other sensor data.

A method and/or system in some embodiments may include extracting, measuring, and characterizing various affinity measures and semantic relationships such as location-terms and conditions (T&C) affinity, app-T&C affinity, T&C-user context affinity, device-T&C affinity, for example, using custom trained machine learning models, for example, using natural language processing (NLP) for text data, convolutional neural network (CNN) for audio/video data. For instance, a location-T&C affinity measure may indicate a relationship (e.g., by distance metric, which may be normalized) between the T&C's terms (e.g., content) and a particular location; app-T&C affinity measure may indicate a relationship (e.g., by distance metric, which may be normalized) between the T&C's terms (content) and a particular app or application; T&C-user context affinity measure may indicate a relationship (e.g., by distance metric, which may be normalized) between the T&C's terms (content) and the user's context; device-T&C affinity measure may indicate a relationship (e.g., by distance metric, which may be normalized) between the T&C's terms (content) and a user's device. In one aspect, similarity analysis may determine affinity measures.

In some embodiments, a method and/or system collects additional data sources from one or more apps available, for example, from an app store or play store, additional to the data collected about the app from the terms and conditions (T&C's) themselves. Examples of the additional data, in some embodiments, include text descriptions of the app and associated images such as the icon and 'in app' photos. This data is used to help identify the 'type' of app such as gaming, entertainment, news, fitness, weather, social media, navigation, or another type. For example, an app such as a gaming app (or another app) may include a graphical icon.

A convolutional neural network (CNN) can be fed one or more icons or images along with the corresponding labels such as gaming, productivity, news, fitness, social media, cooking, or another label. Such label data is available from the app store or play store. Responsive to detecting that a new app is being installed, the new app's accompanying icon or associated image can be passed through the CNN to help classify or determine what type of app is being installed. This information can further help the system identify the appropriate or expected terms and conditions of the app.

There may also be accompanying text descriptions and metadata of the app available from the app store or play store. Training NLP algorithms on this available data with similar labeled categories as images (e.g., gaming, news, social media, productivity, fitness, or another) allows the system and/or method of the present disclosure to identify the expected role the app should have, for example, on the user device such as a smartphone. This text description data, for example, as in the icon or image data, may be additional data different from the terms and conditions document or data. Both the additional text and images—appropriately processed by algorithms from NLP and image classification—can provide valuable information as to what terms and conditions are appropriate for that type of app.

As an example implementation, a CNN may be trained to recognize app types based on a training set of image data labeled with types. To determine an app type based on image data, for example, an app icon and/or in-app screen shot image or images (associated with an app being installed) may be input to the trained CNN. Such icon or screen shot image or images may be available from the app or play store. The CNN, for example, classifies the app into a type based on the input image data, and outputs one or possible labels of the app type. For example, the CNN may output a likelihood percentage value for each classification type, and the type with the highest percentage value may be selected as the app type. Examples of output types may include, but are not limited to, gaming, social media, news, fitness, maps, health, cooking, messaging, athletics, and weather. As another implementation example, app text description may be input to an NLP tool. As another example, a word2vec embedding may be used, in which a sequence of vectors may be processed using a recurrent neural network (RNN). The RNN outputs one of possible labels of the app type.

At 106, based on the T&C acceptance factors, a method and/or system may determine one or more T&C implications related to user's concerns, for example, relating to security (e.g., data protection, device security) and/or risk concerns, and/or one or more user preferences (e.g., the user may want to understand the T&C meaning, implication and risks prior to accepting the terms and conditions for the app the user wants to install). In some embodiments, the T&C implications can be related to the primary owner of a device or other users of the device. In some embodiments, determining of the T&C implications may further include cross referencing the T&C text implications with current phone (or device) settings and other installed apps and/or software to provide the user with up-to-date and clearer results of accepting the T&C.

In one aspect, the T&C implications are determined by analyzing T&C data and inferring a reason as to why an X-type app needs access to a Y-type service using, for example, using custom NLP models. By way of examples, the NLP models are used to infer implications from questions such as "Why does a music app need to know your GPS location?", "Why does a weather app need to have access to payment info such as asking for credit card details?", "Why does a gaming app need to know my contact list?", "Why does a news app need access to my images?". Answers to such questions may be automatically determined based on historical user data and/or available public data such as the Internet data, for example, using natural language processing techniques.

An example implementation creates a space of X multiples of Y implications with each having a binary 'ok' or 'not ok' flag, for example, '1' or '0' flag. The space may be bounded, that is, the system can establish threshold to set an upper bound. In an embodiment, users can explicitly alter these flags for the implications via a graphical user interface (GUI). Based on the user feedback or learned from historical user feedback or interaction data, the system may allow accesses. For example, it may make sense for social-media apps to have access to photos; weather and/or navigation apps to have access to GPS. In one aspect, in such scenarios, one or more accesses inferred from T&C factors do not raise a warning to the user during the installation. For example, installation of a weather app that asks for access to the GPS in its T&C's does not raise a warning that the app accesses user location device. As another example, a gaming app's T&C that asks for access to a contact list would raise a flag to the user, for instance, if an implication flag associated with that gaming app indicates 'not ok'. In an embodiment, implications may be stored in a binary format (e.g., 0 or 1), as binary results from the space of X-type of apps crossed with Y-type of services (e.g., app, or online services). The amount of pre-loaded customization of the setting of these implications may vary with the user.

At 108, a method and/or system may dynamically generate one or more rules for controlling or configuring a new T&C, one or more aspects of the user phone (device) such as turning on or off a sensor coupled to the device. By way of examples, generated rules may include one or more rules, which may restrict access of the app to data or sensors, restrict the interaction of the app with other apps, configure the device, sensor(s), other app(s), and/or others.

For instance, the processing at 106 creates the implications of X-type app with Y-type service. In an embodiment, these implications are used to notify the user responsive to detecting that an 'inappropriate' request is made by X-type app for Y-type service. This serves as a notification or warning to the user to help them understand the terms and conditions of the app or service. In some aspects, when a user is warned of one or more of these implications they may proceed by cancelling the installation or accepting the T&C's in their current form.

A method and/or system in some embodiments may dynamically propose an option to continue the installation of the app but with changes in place that directly prevent the application from accessing Y-type service that was identified in the original implication. While such an option may prevent some features of the app from functioning, the option provides security and clarity to the user. Operations to implement one or more rules may be available as part of the phone's operating system and may be accessed individually app-by-app. The system and/or method of the present disclosure may leverage these operations at the time of app installation so that the behavior of the app is in-line with the implications, e.g., as setup by the system and/or method of the present disclosure based on identified app-type and service type, which may be modified by the user.

A method and/or system in some embodiments may dynamically activate or trigger one or more rules each time the installed app runs. In some aspects, a method and/or system in some embodiments may dynamically activate or trigger one or more rules at a time the app is predicted or expected to run, for example, next T period of time for K duration, for example, an app that uses GPS is predicted to run in the next 20 minutes and predicted to run for 2 hours. In some embodiments, a method and/or system may employ a predictive model for determining T and K based on data such as historical uses of an app (e.g., social media app that has history of accessing a phone, a weather or navigation app accessing a location device such as a GPS device), the context of usage of the apps (e.g., interactions with other apps or services each with their own T&Cs), and a duration of the user engagement with the app.

In some embodiments, a method and/or system may also re-purpose or transform the terms and conditions document into a different format, such as audio format (e.g., by translating text-to-audio format), for instance, based on user data. For instance, responsive to determining that a user of the device may be associated with characteristics such as low literacy, low vision or another characteristic, or that a user prefers a different format, a method and/or system may customize a presentation of the terms and conditions by transforming the terms and conditions to a different modality such as voice, for instance, responsive to detecting user app installation activity with that user.

At 110, one or more rules, dynamically generated, may be applied (e.g., activated or triggered) to control one or more aspects of the terms and conditions, installed app, and/or the device (e.g., a smartphone). For instance, an installation setting of the app and/or a device setting may be automatically configured according to user preference or device preference setting. Example of such configuration may include setting parameter or attribute values associated with running of the app, such as turning a notification feature on or off, disallowing the app to access data such as contact data or photo data stored on the device, disallowing the app to send location information associated with the device, tuning on or off one or more sensors coupled to the device, and/or others.

Figure 2:
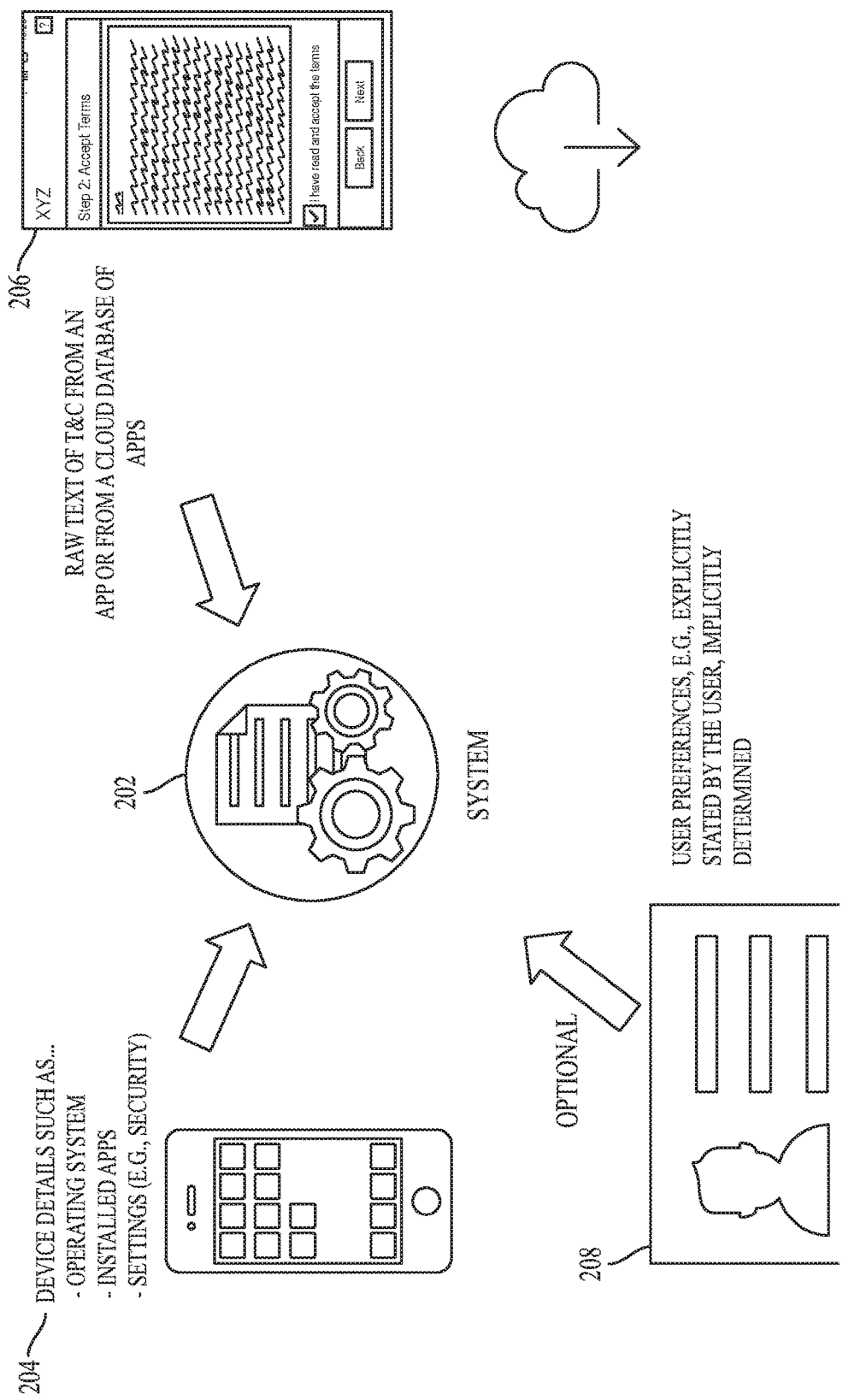
FIG. 2 is a diagram illustrating an overview of a system in one embodiment.

FIG. 2 is a diagram illustrating an overview of a system in one embodiment. A system 202 of the present disclosure in one aspect may receive data such as device details of a device 204 (on which an application is to be installed or run). Device details, for example, may include information about an operating system of the device, one or more installed apps or applications, and device setting (e.g., security settings and other settings). The system 202 may also receive a terms and conditions document 206, for example, in raw text or another format, from a provider of the application to be installed or run on the device. The system 202 may also receive user data, for example, use preferences which are explicitly entered or input by a user of the device and/or implicitly retrieved or learned. Based on the information received, the system 202 may determine one or more terms and conditions implications of installing or running the application on the user device 204, and present one or more terms and conditions implications in a summary form. The system 202 may generate one or more rules dynamically to configure or reconfigure device settings, application settings or other settings on the user device to customize the running of the application according to specific user or device preference.

Figure 3:
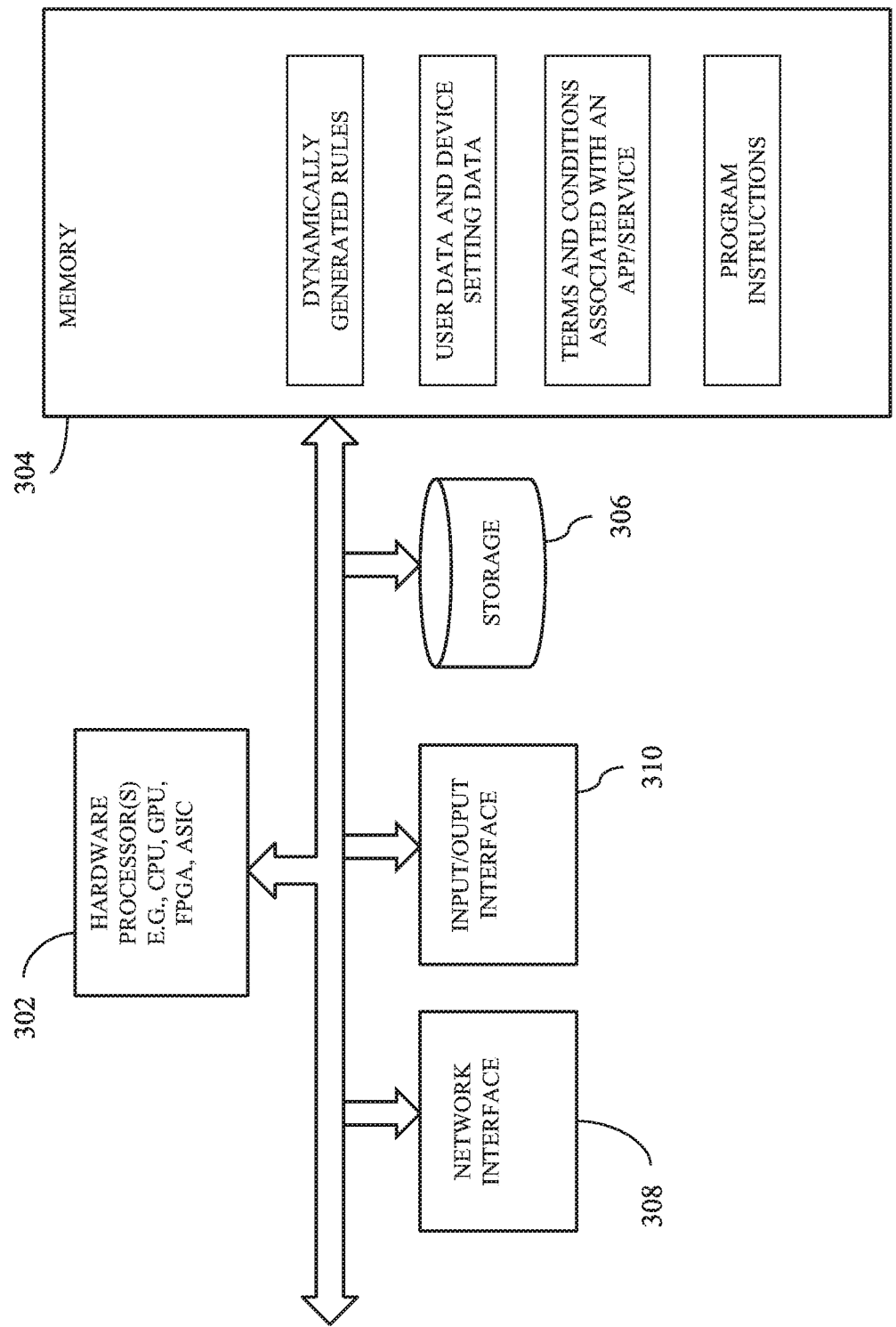
FIG. 3 is a diagram illustrating components of a system in one embodiment.

FIG. 3 is a diagram showing components of a system in one embodiment, which may provide read-assist for terms and conditions in installing or executing an application or a service (e.g., a web service, a cloud service) or the like. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and provide read-assist for terms and conditions of an application, for instance, to be installed on a device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 304 may, for example, store instructions and/or data for functioning of one or more hardware processors 302, and may include an operating system and other program of instructions and/or data. One or more hardware processors 302 may receive a request to install an application on a device, and also receive data associated with the device and a set of users associated with the device. One or more hardware processors 302 may identify acceptance factors specified in a terms and conditions document associated with the application to be installed on the device, and may determine one or more terms and conditions implications of installing the application on the device based on the acceptance factors. One or more hardware processors may present a summary of the terms and conditions implication, and may cross-reference the terms and conditions implication with current device settings and other installed applications on the device, and present information associated with the cross-reference in the summary. One or more hardware processors may 302 customize a presentation of the terms and conditions document based on user characteristics. In some embodiments, one or more hardware processors 302 may transform a modality of presenting the summary of the terms and conditions implication, for instance, from text to voice, from text to visuals, and/or another transformation.

One or more hardware processors 302 may dynamically generate one or more rules to control at least a running of the application or application execution on the device based on one or more terms and conditions implications. One or more hardware processors 302 may activate one or more rule on the device. Activation of one or more rules may run the application in a controllable manner, for example, according to user preference and/or preferred device setting.

One or more rules, which may be dynamically generated may reconfigure a device setting on the device, configure an application setting, and/or modify terms and conditions specified in the terms and conditions document. In some embodiments, one or more rules may be stored on a memory device 304 and/or a storage device 306, and may be communicated via a network interface 308. Dynamically generated one or more rules may include, but not limited to, a rule for modifying part of the terms and conditions document, a rule for removing part from the terms and conditions document, a rule for restricting access of the application to data stored on the device, a rule restricting access of the application to a sensor coupled to the device, a rule for restricting an interaction of the application with other applications coupled with the device, and/or a rule for configuring at least one of the device, a sensor associated with the device, and another application associated with the device.

Some of the data associated with the device and the set of users may be received via a network interface 308 from a remote device, and may be temporarily loaded into the memory device 304, for example, for determining one or more terms and conditions implications. The learned prediction model may be stored on memory 304, for example, for execution by one or more hardware processors 302. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
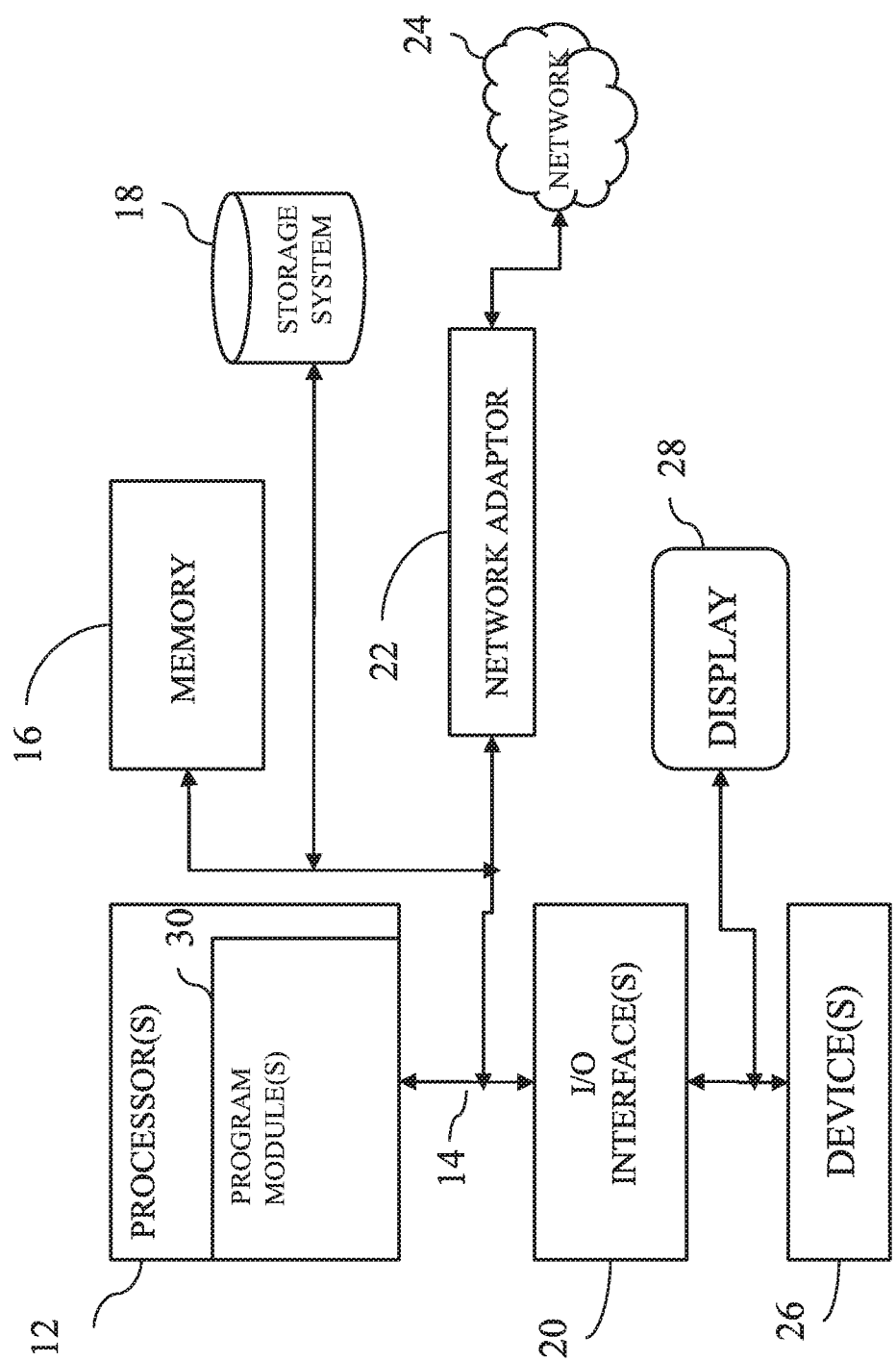
FIG. 4 illustrates a schematic of an example computer or processing system that may implement a system in one embodiment.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of deploying a computer application on a computing device based on terms and conditions associated with the computer application, comprising:
   receiving a request to install an application on a device, the application having a terms and conditions document;
   receiving data associated with the device and a set of users associated with the device;
   identifying acceptance factors specified in the terms and conditions document associated with the application to be installed on the device;
   determining a terms and conditions implication of installing the application on the device based on the acceptance factors, the terms and conditions implication including a risk to device security, the determining of the terms and conditions implication including inferring a reason as to why a type of the application needs to access a type of a service existing on the device requested in the terms and conditions;
   dynamically generating a rule to control at least a running of the application on the device based on the terms and conditions implication to mitigate the risk to device security; and
   activating the rule on the device, the activating the rule controlling the running of the application on the device.

2. The method of claim 1, wherein one or more rules are dynamically generated to reconfigure a device setting on the device.

3. The method of claim 1, wherein one or more rules are dynamically generated to configure an application setting on the device.

4. The method of claim 1, wherein one or more rules are dynamically generated to modify terms and conditions specified in the terms and conditions document.

5. The method of claim 1, further comprising presenting a summary of the terms and conditions implication.

6. The method of claim 5, further comprising cross-referencing the terms and conditions implication with current device settings and other installed applications on the device, and presenting information associated with the cross-referencing in the summary.

7. The method of claim 1, wherein the dynamically generated rule comprises a rule for performing at least one of: modifying part of the terms and conditions document, removing part from the terms and conditions document, restricting access of the application to data stored on the device, restricting access of the application to a sensor coupled to the device, restricting an interaction of the application with other applications coupled with the device, and configuring at least one of the device, at least one sensor associated with the device, and another application associated with the device.

8. The method of claim 1, further comprising customizing a presentation of the terms and conditions document based on user characteristics.

9. The method of claim 8, wherein the customizing comprises transforming a modality of presenting the summary of the terms and conditions implication.

10. A system comprising:
at least one hardware processor coupled with a memory and a network interface;
the at least one hardware processor operable to at least:
receive a request to install an application on a device, the application having a terms and conditions document;
receive data associated with the device and a set of users associated with the device;
identify acceptance factors specified in the terms and conditions document associated with the application to be installed on the device;
determine a terms and conditions implication of installing the application on the device based on the acceptance factors, the terms and conditions implication including a risk to device security, wherein the hardware processor is further operable to infer a reason as to why a type of the application needs to access a type of a service existing on the device requested in the terms and conditions;
dynamically generate a rule to control at least a running of the application on the device based on the terms and conditions implication to mitigate the risk to device security; and
activate the rule on the device, the activating the rule controlling the running of the application on the device.

11. The system of claim 10, wherein one or more rules are dynamically generated to at least one of reconfigure a device setting on the device, configure an application setting, and modify terms and conditions specified in the terms and conditions document.

12. The system of claim 10, wherein the at least one hardware processor is further operable to present a summary of the terms and conditions implication.

13. The system of claim 10, wherein the at least one hardware processor is further operable to cross-reference the terms and conditions implication with current device settings and other installed applications on the device, and present information associated with the cross-reference in the summary.

14. The system of claim 10, wherein the dynamically generated rule comprises a rule for performing at least one of: modifying part of the terms and conditions document, removing part from the terms and conditions document, restricting access of the application to data stored on the device, restricting access of the application to a sensor coupled to the device, restricting an interaction of the application with other applications coupled with the device, and configuring at least one of the device, a sensor associated with the device, and another application associated with the device.

15. The system of claim 10, wherein the at least one hardware processor is further operable to customize a presentation of the terms and conditions document based on user characteristics.

16. The system of claim 15, wherein the at least one hardware processor is further operable to customize by transforming a modality of presenting the summary of the terms and conditions implication.

17. A computer readable storage medium storing a program of instructions executable by a machine to perform a method comprising:
receiving a request to install an application on a device, the application having a terms and conditions document;
receiving data associated with the device and a set of users associated with the device;
identifying acceptance factors specified in the terms and conditions document associated with the application to be installed on the device;
determining a terms and conditions implication of installing the application on the device based on the acceptance factors, the terms and conditions implication including a risk to device security, the determining of the terms and conditions implication including inferring a reason as to why a type of the application needs to access a type of a service existing on the device requested in the terms and conditions;
dynamically generating a rule to control at least a running of the application on the device based on the terms and conditions implication, to mitigate the risk to device security; and
activating the rule on the device, the activating the rule controlling the running of the application on the device.

18. The computer readable storage medium of claim 17, wherein one or more rules are dynamically generated to at least one of reconfigure a device setting on the device, configure an application setting on the device, and modify terms and conditions specified in the terms and conditions document.

19. The computer readable storage medium of claim 17, wherein the method further comprises cross-referencing the terms and conditions implication with current device settings and other installed applications on the device, and presenting information associated with the cross-referencing in the summary.

20. The computer readable storage medium of claim 17, where in the method further comprises customizing a presentation of the terms and conditions document based on user characteristics.

* * * * *